(12) United States Patent
Mojena

(10) Patent No.: US 6,387,261 B1
(45) Date of Patent: May 14, 2002

(54) SERVICEABLE FILTER WITH BYPASS

(76) Inventor: Gregory Mojena, Calle 10 Bloque, 7 #1 Sabana Gardens, 00983 Carolina, PR (US)

(*) Notice: Subject to any disclaimer, the term of this patent is extended or adjusted under 35 U.S.C. 154(b) by 0 days.

(21) Appl. No.: 09/395,489

(22) Filed: Sep. 14, 1999

Related U.S. Application Data (60) Provisional application No. 60/100,382, filed on Sep. 15, 1998.

(51) Int. Cl.[7] ............................................. B01D 29/58
(52) U.S. Cl. .................... 210/315; 210/316; 210/323.2; 210/337; 210/338; 210/342; 210/452; 210/455; 210/483; 210/488; 210/489; 210/497.01
(58) Field of Search .............................. 210/323.2, 335, 210/337, 338–339, 232, 238, 452, 448, 497.01, 314–316, 650, 652, 673, 695, 289–291, 111, 484–485, 483, 488, 489, 492, 455, 460–461, 433.1, 458, 487, 342

(56) References Cited

U.S. PATENT DOCUMENTS

| | | | |
|---|---|---|---|
| 690,838 A | * | 1/1902 | Cox |
| 858,234 A | | 6/1907 | Treager |
| 965,836 A | * | 7/1910 | Ray |
| 1,035,733 A | | 8/1912 | Pierce |
| 1,044,601 A | * | 11/1912 | Thiem |
| 1,284,944 A | | 11/1918 | St. Pierre |
| 2,505,305 A | | 4/1950 | Shaefer |
| 4,045,351 A | * | 8/1977 | Peterson ..................... 210/238 |
| 4,909,937 A | | 3/1990 | Hoffmann et al. |
| 5,252,206 A | | 10/1993 | Gonzales |
| 5,372,718 A | * | 12/1994 | Zebian ....................... 210/301 |
| 5,954,071 A | * | 9/1999 | Magliocca |

* cited by examiner

Primary Examiner—Matthew O. Savage
Assistant Examiner—Marianne Ocampo
(74) Attorney, Agent, or Firm—Nils H. Ljungman & Associates (57) ABSTRACT

A filter for removing solids from a liquid comprising a filter housing with an inlet and an outlet, a first filtration element nested within the filter housing and having a first plurality of openings, a second filtration element nested within the first filtration element and having a second plurality of openings for filtering grease and non-particulate substances, where the second filtration element has a shorter height with an upper end thereof being located below at least one opening of the first filtration element thereby allowing bypassing of the second filtration element. Alternatively, the filter may also include a third filtration element nested within the second filtration element and having a third plurality of openings where the second filtration element has a shorter height than the third filtration element, an upper end of the second filtration element being located below at least one opening of the third filtration element thereby allowing bypass of the second filtration element. In yet another embodiment, the first plurality of openings of the first filtration element further comprises primary openings and secondary openings, the primary openings being smaller than the secondary openings and being positioned at a lower elevation below the secondary openings. Moreover, in yet another embodiment, the filter may include a first filtration element and a shortened filtration element nested within the first filtration element. Both the first filtration element and the shortened filtration element may be nested within a support insert.

8 Claims, 7 Drawing Sheets

SERVICEABLE FILTER WITH BYPASS

This application claims the benefit of U.S. Provisional Application No. 60/100,382 filing date Sep. 15, 1998.

BACKGROUND OF THE INVENTION

1. Field of the Invention

The present invention is related to the field of filters for removing solids from a liquid. More specifically, the invention relates to a serviceable filter with bypass features that may be installed at the drain of a liquid holding tank such as a sink or a wash basin.

2. Description of Related Art

Filtering a flowing liquid, such as water, is desirable in many situations, such as in household drains including sinks and wash basins. Generally, filtering is desirable when a flowing liquid contains solid or liquid contaminants and foreign materials. These materials may cause problems, such as blocking conduits, if they are allowed to remain in the water especially when the water is being drained to a septic or sewer system. In drains, such as those extending from a kitchen sink, bathroom sink, or wash basins, a large amount of material can be carried by the draining water. The material may include solids, such as food particles and hair, or liquids such as oils and grease.

Conventional sinks use a bend or trap in which a fluid seal is formed by water collecting in the lower bend. The collected water prevents sewer gasses from passing back out through the drain. The purpose of these traps, is not to trap such contaminants and foreign materials. Generally, however, draining water will force solids past such traps and such solids may collect on a protuberance or be deposited on the sides of the drain conduit. The collection of solids, or contaminating liquids, such as oil or grease, in the conduit can prevent the free passage of the draining water. When a blockage is formed in the conduit downstream of the trap, it is typically removed by using chemical solvents or mechanical devices, such as an auger, commonly referred to as "snake". Chemicals tend to be expensive, very corrosive and detrimental to the environment, while using a "snake" can be an expensive, time consuming procedure as well as labor intensive. Generally, if a mechanical device such as a "snake" is needed to remove a blockage, the services of a plumber is also required to operate it. If the clog is located in a less assessable area, a plumber may need to be called, causing a great deal of inconvenience and cost.

Devices have been developed which attempt to limit material entering the drain. These include basket and strainer devices which are received in the drain opening of a sink and prevent large solids, and to some extent, small solids, from entering the drain. In these filtration devices, the basket or strainer can also designed to be easily removed for cleaning. Such filtering devices for removing solids from a flowing liquid, such as water in a drain, are illustrated in various prior art designs.

For example, U.S. Pat. No. 965,836 to Ray discloses a sink trap including a strainer cylinder/vessel formed of screen wire or metal of finer mesh and an interior receiving pocket with perforation as its bottom. Rings, rods and other elements provide means for attachment of the device to the sink trap. U.S. Pat. No. 1,035,733 to Pierce discloses a similar sink strainer device including a drain with a nested bucket with perforations and a fine screen nested within the bucket.

However, limitations have been found with such prior art systems. Initially, it has been found that, whereas such strainers with fine mesh filtration elements provide good filtration of the water being drained, they tended to become clogged easily by the large contaminants and solids. In addition, it has also been found that when any of the filtration elements become clogged, immediate attention must be given in order to allow continued draining through the filtration devices and to prevent the back-up of the drain. Consequently, such prior art filtration devices require constant cleaning, especially with respect to the fine mesh strainers that tend to become easily clogged, making the use of such fine mesh strainers inconvenient.

Therefore, there exists an unfulfilled need for an improved filter for removing solids from a liquid with filtration elements that are easily serviceable and that provide adequate filtering of the liquid. There also exists an unfulfilled need for such an improved filter with filtration elements that incorporate a bypass feature to allow bypassing of the filtration element when it becomes clogged.

SUMMARY OF THE INVENTION

It is an object of the present invention to provide a filter for removing solids from a liquid.

A second object of the present invention is to provide an improved filter in which the filtration elements are easily serviceable.

A third object of the present invention is to provide an improved filter having nested filtration elements that provides adequate filtering of the liquid.

Yet another object of the present invention is to provide an improved filter with filtration elements that incorporate a bypass feature to allow bypassing of the filtration element when it becomes clogged.

Still further, it is an object of the present invention to provide an improved filter with a filter housing that may be easily installed on a basin of a liquid holding tank such as a sink.

In accordance with preferred embodiments of the present invention, these objects are obtained by an improved filter for removing solids from a liquid comprising a filter housing with an inlet at a top portion and an outlet towards a bottom portion, a first filtration element nested with the filter housing and having a first plurality of openings, a second filtration element nested within the first filtration element and having a second plurality of openings, where the second plurality of openings are smaller in size than the first plurality of openings and are positioned at a lower elevation below at least one opening of the first filtration element thereby allowing bypass of the second filtration element when the second filtration element is clogged. In another embodiment of the present invention, the filter also includes a third filtration element nested within the second filtration element and having a third plurality of openings where the second plurality of openings are smaller in size than the third plurality of openings and are positioned at a lower elevation below at least one opening of the third filtration element thereby allowing bypass of the second filtration element when the second filtration element is clogged.

In another alternative embodiment, the above objects are obtained by the above described filter where the first plurality of openings of the first filtration element further comprises primary openings and secondary openings, the primary openings being smaller than the secondary openings and being positioned at a lower elevation below the secondary openings in a manner to allow bypassing of the primary openings when the primary openings are clogged.

In yet another alternative embodiment, the above objects are obtained by the above described filters where the first filtration element, the second filtration element, and the third filtration element are nested within the filter housing through the inlet of the filter housing and are serviceable through the inlet of the housing. The filter may also comprise an outlet filter positioned at an opening of the outlet, a threaded annular insert for mounting through an opening in a basin of the liquid tank and a threaded connector ring for attaching the top portion of the filter housing to the threaded annular insert.

In yet another embodiment of the present invention, the drain trap filter unit may comprise a filter housing with an inlet at a top portion and an outlet towards a bottom portion, a support insert nested within the filter housing, a first filtration element nested within the support insert and a shortened filtration element nested within said first filtration element. The support insert may have plurality of support members for supporting at least one filtration element. The first filtration element may have a first plurality of openings which allows fluids to pass through the first filtration element towards the outlet while filtering grease and other particulate substances larger than each of the first plurality of openings. The shortened filtration element may have a second plurality of openings allowing fluids to pass there through while filtering solids larger than each opening of the second plurality of openings. In this embodiment, an upper end of the first filtration element is located below at least one opening of the shortened filtration element to allow bypassing of the first filtration element when the first filtration element is clogged. In this regard, each of the first plurality of openings may be smaller than each of the second plurality of openings and the first filtration element may be a disposable paper element.

These and other objects, features, and advantages of the present invention will become more apparent from the following detailed description of the preferred embodiments when viewed in conjunction with the accompanying drawings.

DETAILED DESCRIPTION OF THE INVENTION

Figure 1:
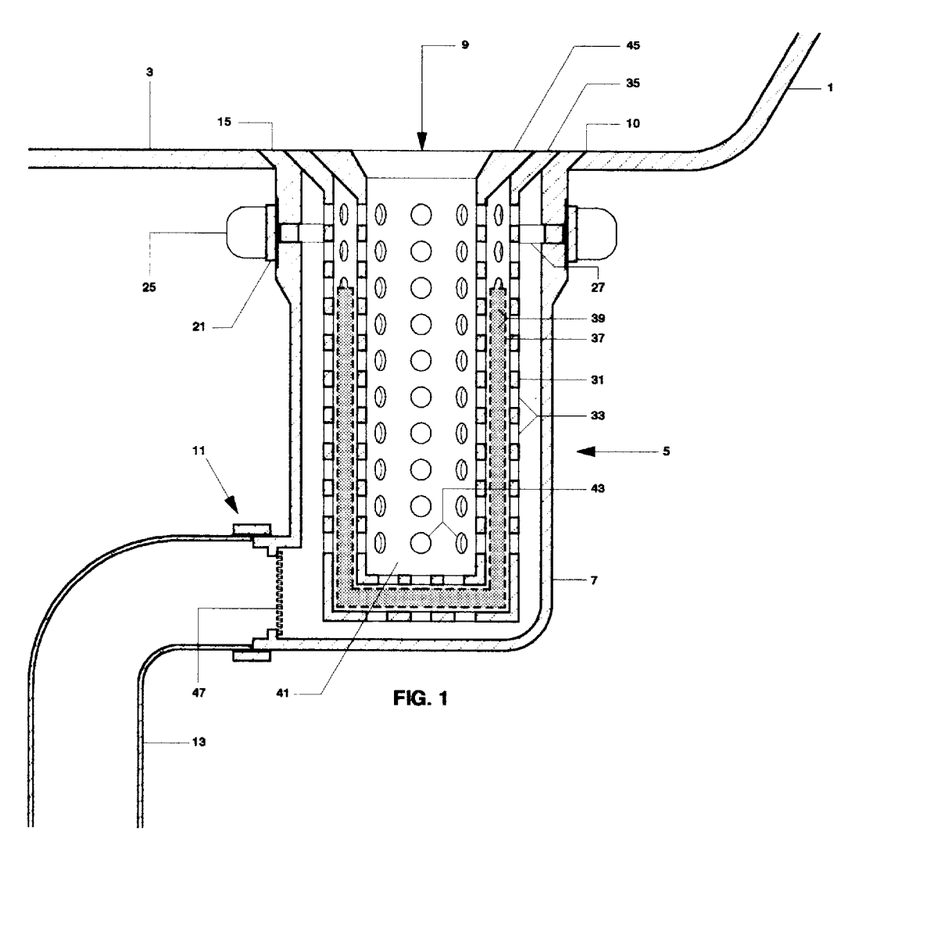
FIG. 1 is a sectional view of a filter in accordance with the preferred embodiment of the present invention.

FIG. 1 illustrates an improved filter in accordance with one embodiment of the present invention where the filtration elements have a bypass feature and may also be easily serviced. As discussed herein below, the present invention ensures a desired level of filtration, while at the same time, the bypass features allow the filtration elements to be bypassed when the filtration elements become clogged. In the present figure, an example of the present invention is illustrated as applied to a liquid holding tank 1 which holds the liquid to be filtered. For instance, the liquid holding tank may be a common household fixture such as a kitchen or bathroom sink. However, as can be appreciated by the one skilled in the art, the liquid holding tank 1 may also be any kind of storage tank for holding a liquid. Whereas in the common household applications, the liquid will generally be water, in other applications, the liquid may also be chemicals, fuel, drinks, or any other liquids in which filtration may be desirable.

As illustrated in FIG. 1, the preferred embodiment of the present filter 5 includes a filter housing 7 with an inlet 9 and an outlet 11. In the present embodiment, the filter housing 7 has a cylindrical shape and is made of a rigid material such as steel. However, in other embodiments, the filter housing 7 may have other shapes, such as rectangular or square, and may be made of various other materials including plastics, composites, and other metals. As can be seen, the inlet 9 is positioned at a higher elevation than the outlet 11 such that liquid will enter the filter 5 through inlet 9 and exit the filter 5 through outlet 11 using gravitational force. The filter housing 7 is mounted to the liquid holding tank 1 in a manner that inlet 9 aligns with an opening 10 on a bottom wall 3 of the liquid holding tank 1 to allow liquid to flow into the filter 5. In addition, the filter 5 and the inlet 9 may be properly dimensioned to allow the user to reach in to service various filter elements, as will be described in further detail later.

Figure 2:
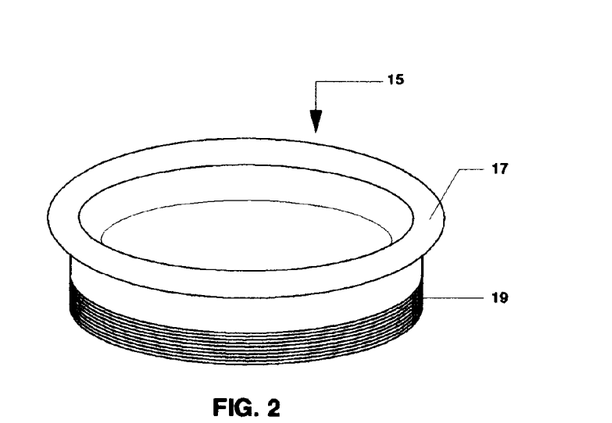
FIG. 2 is a perspective view of a threaded annular insert in accordance with the present invention.
Figure 3:
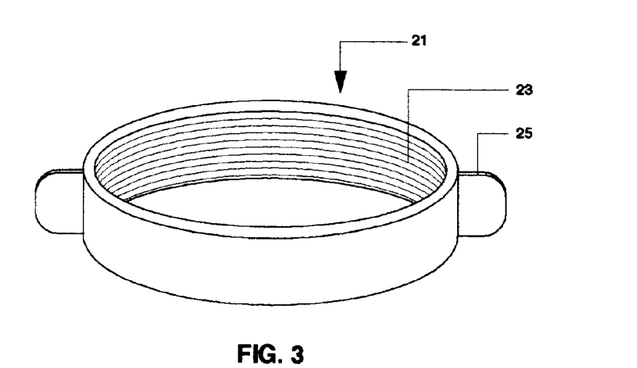
FIG. 3 is a perspective view of a threaded connector ring in accordance with the present invention.

The outlet 11 is illustrated as being mounted to a drain fixture 13, such as a drain pipe, in a manner that liquid may exit the filter 5 through the outlet 11 and into the drain fixture 13. In this regard, the filter housing 7 is mounted onto the liquid holding tank 1 through a threaded annular insert 15 which is installed through an opening on the bottom wall 3 of the liquid holding tank 1. The threaded annular insert 15 is more clearly illustrated in FIG. 2 as having a sealing portion 17 which seals the opening 10 of the liquid holding tank 1. The threaded portion 19 is provided such that the filter housing 7 may be mounted to the liquid holding tank 1 using a threaded connector ring 21 illustrated in FIG. 3. The threaded connector ring 21 includes a threaded interior 23 which may be engaged with the threaded annular insert 15 and the filter housing 7 to mount the filter 5 to the liquid holding tank 1 as illustrated in FIG. 1. The threaded interior 23, the threaded annular insert 15 and the filter housing 7 are threaded in a manner such that when the threaded connector ring 21 is rotated in one direction, the threaded annular insert 15 and the filter housing 7 are displaced toward one another. Conversely, when the threaded connector ring 21 is rotated in another direction, threaded annular insert 15 and the filter housing 7 are displaced away from one another. Of course, it is known that such an effect may be attained by providing reverse threading on one of the components and a portion of the threaded connector ring 21. In this manner, the mounting of the filter housing 7 to the liquid holding tank 1 may be facilitated. The threaded connector ring 21 may also include at least one flange 25 that allows better leverage in installing the threaded connector ring 21, two being shown in the illustrated embodiment.

Figure 4:
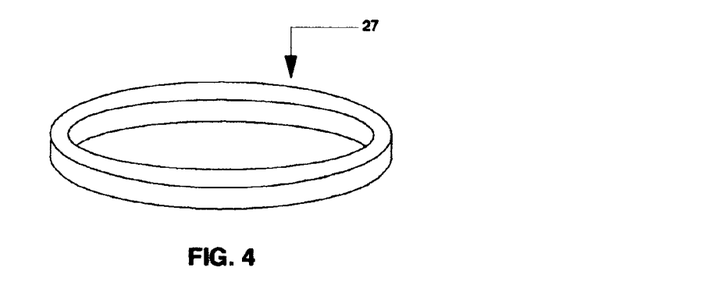
FIG. 4 is a perspective view of a spacer ring in accordance with the present invention.

The preferred embodiment of the present invention, as illustrated in FIG. 1, also includes a spacer ring 27 disposed between the threaded annular insert 15 and the filter housing 7 to allow elevational positioning of the filter housing 7 with respect to the drain fixture 13. One embodiment of the spacer ring 27 is more clearly illustrated in FIG. 4. Of course, spacer rings of different dimensions may be provided depending on the relative elevational positions of the filter housing 7 and the drain fixture 13. Furthermore, in addition to serving a elevational positioning function, the spacer ring 27 may also serve a sealing function between the threaded annular insert 15, the filter housing 7, and the threaded connector ring 21. In this regard, the spacer ring may be made from rubber, felt, synthetic materials, or any other materials that may provide appropriate elevational positioning function as well as sealing function.

Figure 5:
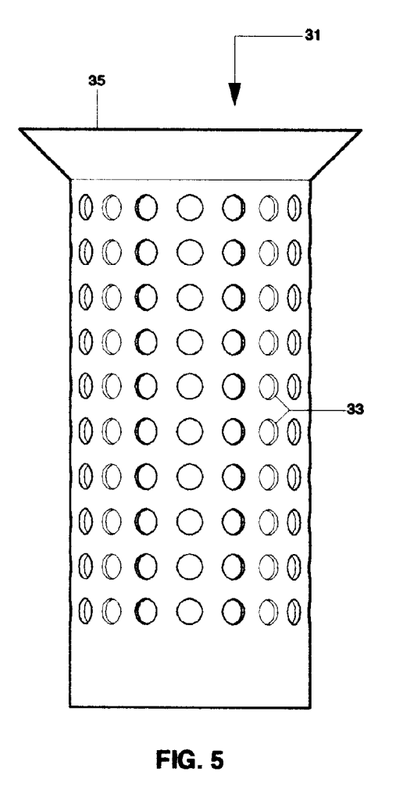
FIG. 5 is a side view, partially in section, of the first filtration element as shown in FIG. 1, in accordance with the present invention.

As illustrated in FIG. 1, the filter 5, in accordance with the preferred embodiment of the present invention, includes a first filtration element 31 nested within the filter housing 7. The bottom and peripheral walls of the first filtration element 31 are provided with a first plurality of openings 33 which allows fluids to pass through the first filtration element 31 while filtering solids larger than each of the openings. The first filtration element 31 is better illustrated in FIG. 5. As can be seen, the first plurality of openings 33 of the first filtration element 31 are generally circular in shape. However, as will be recognized by one skilled in the art, the first plurality of openings 33 may also have various other shapes. An annular ring member 35 may also be provided to allow nesting within the threaded annular insert 15 in the manner illustrated in FIG. 1, flush with the bottom wall 3 of liquid holding tank 1.

The filter 5 also includes a second filtration element 37 as shown in FIG. 1. The second filtration element 37 includes a second plurality of openings 39 which allows fluid to pass through the second filtration element 37 while filtering solids larger than each of the openings. The second plurality of openings 39 are smaller in size than the first plurality of openings 33 and are positioned below at least one opening of the first filtration element 31, the second filtration element 37 being shorter than the first filtration element 31. This positioning of at least one opening of the first filtration element 31 above the second filtration element 37 allows the bypassing of the second filtration element 37 when it becomes clogged. More specifically, when the second filtration element 37 becomes clogged, liquid will no longer flow through the second plurality of openings 39, and thus, the liquid level will rise within second filtration element 37 flow from the inlet 9 through the first filtration element 31 above the second filtration element 37, rather than through both first filtration element 31 and second filtration element 37. This is possible since the first filtration element 31 includes openings which are larger and are at a higher elevation than the second filtration element 37.

Figure 6:
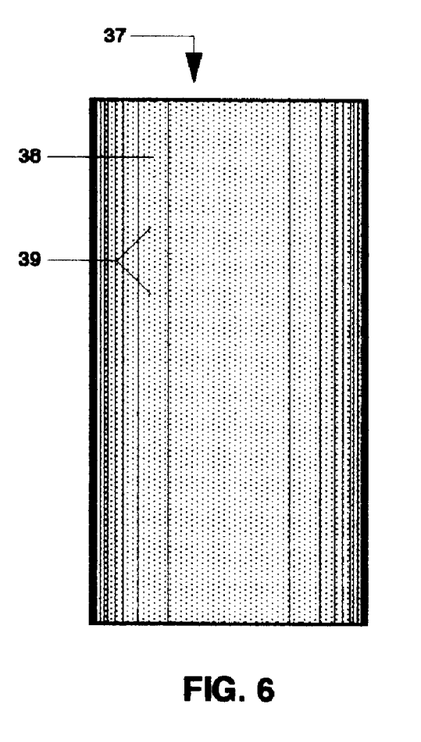
FIG. 6 is a side view of the second filtration element shown in FIG. 1 in accordance with the present invention.

It should be clear that because the second plurality of openings 39 are smaller in size than the first plurality of openings 33, the second filtration element 37 will become clogged before the first filtration element 31. The second filtration element 37 is better illustrated in FIG. 6 which shows that the second filtration element 37 may be paper or toweling type material 38 in which the openings 39 are pores or interstices between the fibers or strands of the woven or non-woven material, or it can be made of a mesh with the second plurality of openings 39 being the openings in the mesh. In this embodiment, the material 38 provides high degree of filtration to the liquid as it passes through the second filtration element 37, being designed to trap grease and other non-particulate substances. Of course, it could be appreciated by one skilled in the art that the second filtration element 37 may also be designed in a similar manner to the first filtration element 31. Thus, in such an alternative embodiment, the second filtration element 37 would have a plurality of openings being positioned at a lower elevation than the first plurality of openings 33. In addition, it can be appreciated that whereas a mesh 38 is specifically disclosed, other filtration elements may be used including synthetic filaments, paper based filter elements and the like and may be disposable. In this regard, bio-degradable materials such as paper based filter elements are preferable since they impose the least amount of negative impact to the environment.

Figure 7:
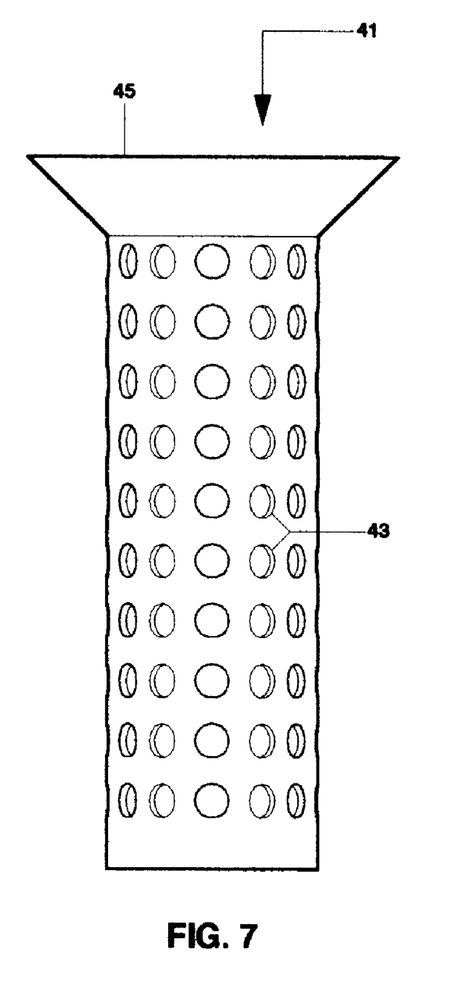
FIG. 7 is a side view of one embodiment of the third filtration element as shown in FIG. 1.

In accordance with the preferred embodiment of the present invention, filter 5 also includes a third filtration element 41 nested within the second filtration element 37. The third filtration element 41 includes a third plurality of openings 43 which allows fluid 3 to pass through the third filtration element 41 while filtering solids larger than each of the openings. The third filtration element 41 is better illustrated in FIG. 7, and in the preferred embodiment, may be substantially similar to the first filtration element 31. More specifically, the third filtration element 41 includes a third plurality of openings 43 which are circular in shape and are larger in size than the second plurality of openings 39. The third filtration element 41 may also include a circular ring member 45 which allows the third filtration element 41 to nest within the second filtration element 37 and seal against the annular ring member 35 of the first filtration element in the manner shown in FIG. 1. It should also be noted that in the preferred embodiment, the third plurality of openings 43 are provided on the third filtration element 41 in a manner that they extend above the height of the second filtration element 37. This positioning allows the bypassing of the second filtration element 37 when the second filtration element 37 becomes clogged so that the liquid passes through the third filtration element 41, through the first filtration element 31 and into the outlet 11. This arrangement is particularly well suited for use with a second filtering element made of bio-degradable materials or structurally non-rigid materials, such as paper toweling, since the first and third filtering elements will provide the structural support such materials lack at both inner and outer sides thereof. In this regard, the first and third filtration elements serve primarily as strainers for solid particles while the second filtration element is primarily designed to serve as a grease trap. In an alternative embodiment, the second filtering element 37 may be attached to an outer periphery of the third filtraiton element 41 using an adjustable ring (not shown) which may be made of velcro, a rubber band or other material in order to hold the second and third filtration elements together.

In operation, the filter 5 in accordance with the preferred embodiment of the present invention as illustrated in FIG. 1, provides filtration of liquid while allowing easy servicing of the filter elements and also bypassing of the filtration elements as they become clogged. More specifically, the liquid enters the filter 5 through the inlet 9. Liquid then passes through the third filtration element 41 through the third plurality of openings 43. The third plurality of openings 43 filter larger solids that may be present in liquid 3. The filtered liquid is then filtered through the second filtration element 37 through the second plurality of openings 39 which are smaller in size than the third plurality of openings 43. The second plurality of openings 39 filter solids from liquid which were not filter by the third filtration element 41. Subsequently, the liquid passes through the first filtration element 31 through the first plurality of openings 33 and progresses to the outlet 11 and into the drain fixture 13. It should also be noted, that the present embodiment of the filter 5 further includes an outlet filter 47 positioned at an opening of the outlet 11. The outlet filter 47 serves a backup filtration function where it prevents objects flowing pass the various filtration elements from entering the drain fixture 13 such as when the filtration elements are removed for servicing.

Because the second filtration element 37 includes the second plurality of openings 39 which are smaller in size than either the third plurality of openings 43 or the first plurality of openings 33, it will clog before either of the third or first filtration elements. When this occurs, the liquid which enters the filter through inlet 9 flows through the third filtration element 41 and through the first filtration element 31 and subsequently, into the outlet 11. The clogged second filtration element 37 is thus, bypassed altogether in this manner thereby allowing the filter 5 to continue draining liquid. As should be now evident, this is made possible because the height of the second filtration element 37 is lower than that of at least one opening of the first filtration element 31 as well as at least one opening of the third filtration element 41. In this manner, an effective bypass is provided in filter 5 that prevents drain back-up and eliminates the need for immediate servicing.

Because all of the filtration elements rest within each other at their top ends flush with the bottom wall 3 of the sink or other liquid holding tank 1, they do not interfere with normal use thereof. Yet, because they are removable from above; i.e., from within the sink or other liquid holding tank 1, they make removal thereof easy for replacement and/or cleaning of the grease-trapping second filtration element without the user having to uncomfortably squat and work in the limited space commonly present under a kitchen or bathroom sink.

Figure 12:
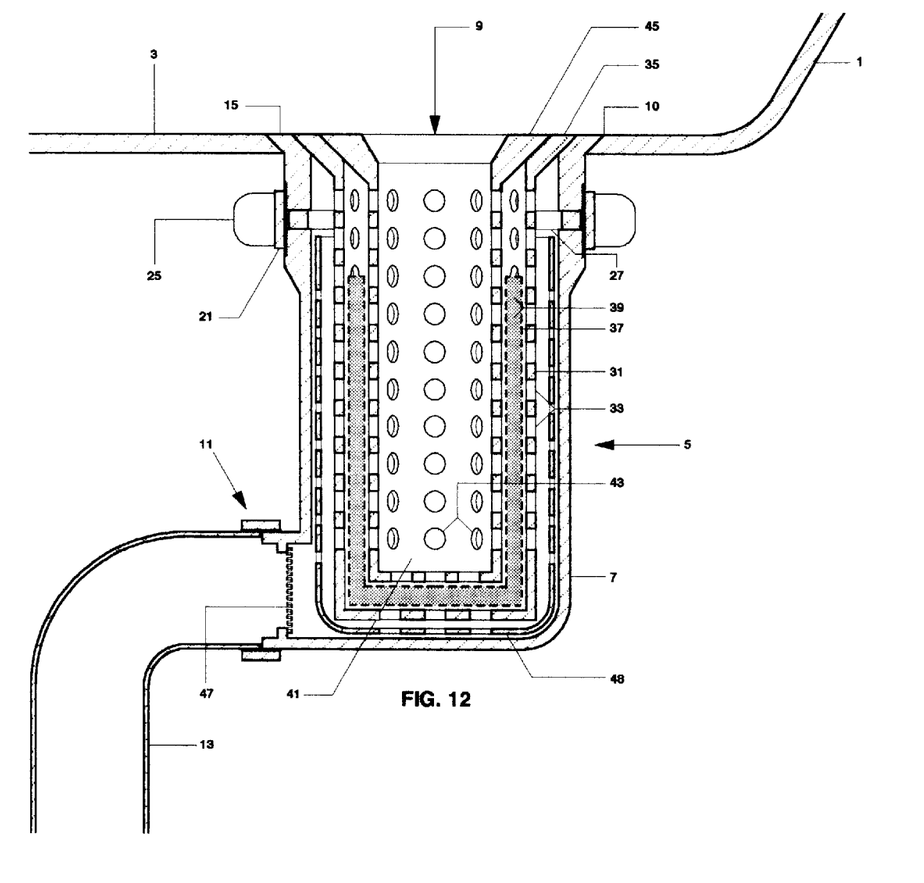
FIG. 12 is another embodiment of the present invention, showing the filter unit being provided with a fourth filtration element (48).

Moreover, in accordance with yet another embodiment of the present invention, as the FIG 12 the filter 5 may also be provided with a fourth filtration element 48 on the outer periphery of the first filtration element 31 to serve an additional filtering function. Like the second filtration element 37, the fourth filtration element may have a fourth plurality of openings which allows fluids to pass through the fourth filtration element while filtering solids larger than each opening of the fourth plurality of openings. The fourth filtration element may be shorter than the first filtration element 31 such that at least one opening of the first filtration element 31 is above the fourth filtration element thereby allowing the bypassing of the fourth filtration element when it becomes clogged. The fourth filtration element may also be made of the same material as the second filtration element 37 such as woven or a non-woven material having interstices. In this regard, the fourth filtration element may be a bio-degradable paper toweling or the like and be primarily designed to serve as an additional grease trap and be attached to the periphery of the first filtration element 31 using an adjustable ring (not shown) which may be made of velcro, a rubber band or other material.

Figure 8:
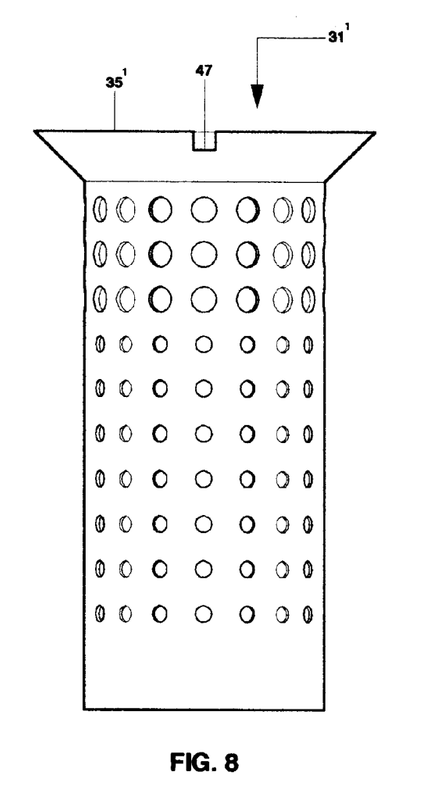
FIG. 8 is a side view of an alternative embodiment of the first filtration element, also in accordance with the present invention.
Figure 9:
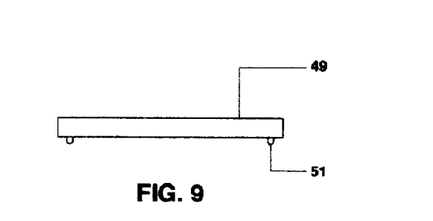
FIG. 9 is a side view of a stopper for use with the filter of the present invention.

The present invention may also be practiced through a filter having only two filtration elements rather than the three elements as illustrated in FIG. 1. In this regard, the first filtration element 31 may be provided together with only the second filtraiton element 37. Alternatively, the first filtration element 31 may be provided together with the third filtration element 41 where the third plurality of openings 43 are sized smaller than the first plurality of openings 33 with the exception of the openings at the higher elevation (such as the top three rows). An example of such filtration element is shown in FIG. 8. It should be evident that whereas FIG. 8 illustrates an alternative embodiment of the first filtration element 31', the third filtration element 41 may also be made in a similar manner such that the third filtration element 41 serves to filter out even smaller solids within the liquid. In addition, the alternative embodiment of the first filtration element 31' may also be used in filter 5 when an additional bypassing feature for the first filtration element 31 is desired. In this embodiment, larger openings would be provided at the higher elevation (such as the top three rows) of the first filtration element 31. Thus, when the first plurality of openings 33 become clogged, the liquid can bypass the first filtration element 31 through these larger openings at the higher elevational levels. Furthermore, these alternative embodiments of the first filtration element 31' can be provided with an annular ring member 35' having at least one recessed step 47 for receiving a protrusion 51 on a stopper 49 as illustrated in FIG. 9. The stopper 49 serves to seal the inlet 9 of the filter 5 such that the flow of liquid through the filter 5 is stopped.

Figure 10:
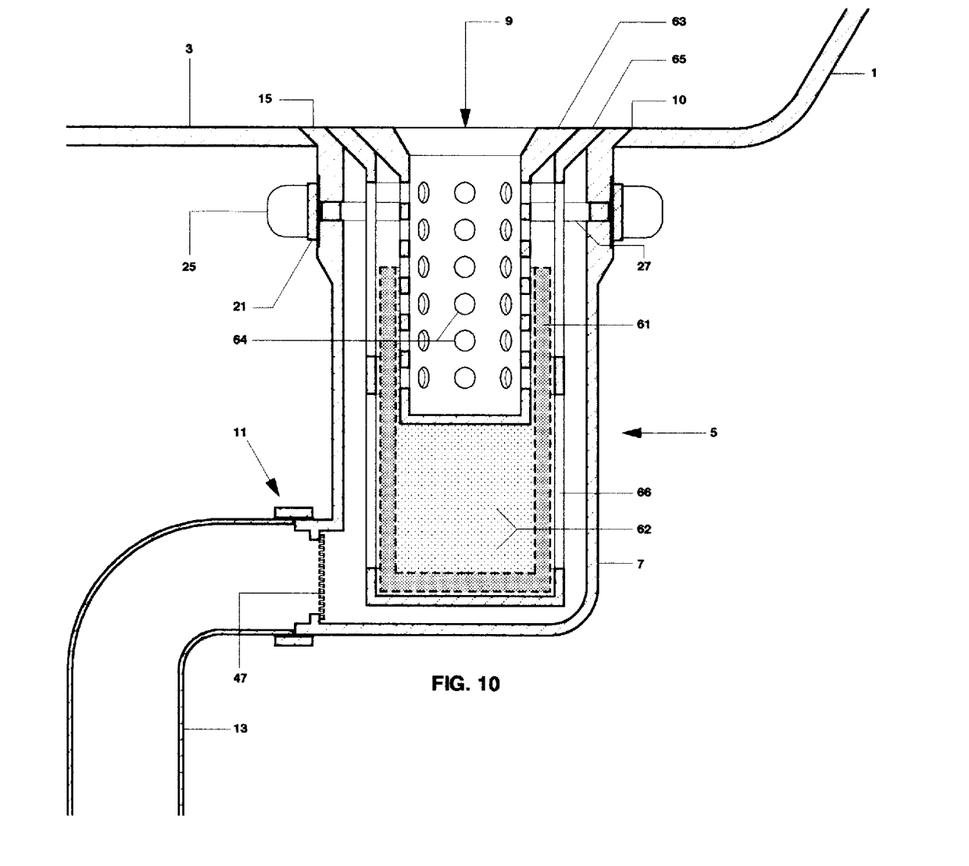
FIG. 10 is a sectional view of a filter in accordance with another embodiment of the present invention.

In yet still another embodiment of the present invention as illustrated in FIG. 10, the filter 5 may be comprised of a first filtration element 61 and a shortened filtration element 63 nested within the first filtration element 61. In this embodiment, the first filtration element 61 and the shortened filtration element 63 are in turn, nested within a support insert 65 which is more clearly illustrated in FIG. 11. As can be seen, the support insert 65 includes a plurality of support members 66 which may be made of metal or plastic for supporting at least one filtration element therein. Because the support insert 65 primarily serves a support function and not a filtering function, large openings 67 are provided so that the fluid flow through the filtration elements supported therein is not inhibited.

Figure 11:
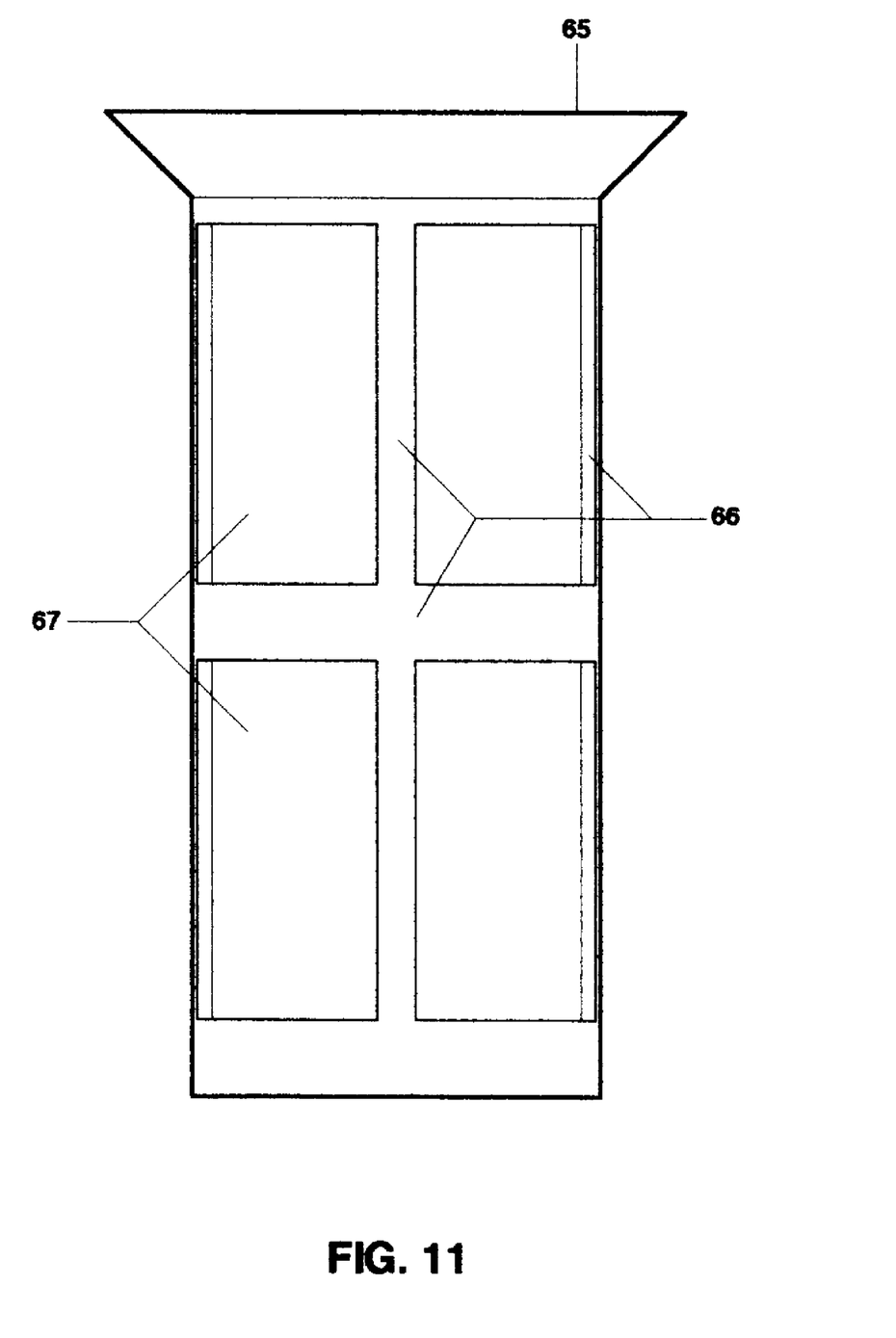
FIG. 11 is a side view of one embodiment of the support insert as shown in FIG. 10.

Referring again to FIG. 10, the first filtration element 61 includes a first plurality of openings 62 for filtering particulates larger than each of the first plurality of openings 62 as well as nonparticulates such as grease. The first filtration element 61 may be attached to the shortened filtration element 63 and/or be supported between the support insert 65 and the shortened filtration element 63. In this regard, the first filtration element 61 may be attached to the shortened filtration element 63 using an adjustable ring (not shown) which may be made of velcro, a rubber band or another material. The shortened filtration element 63 includes a second plurality of openings 64 which filter particulates larger than each of the second plurality of openings 64. The first filtration element 61 is also dimensioned such that at least one of the second plurality of openings 64 of the shortened filtration element 63 is above the first filtration element 61 thereby allowing the bypassing of the first filtration element 61 when it becomes clogged. The first filtration element 63 may be made of a bio-degradable paper toweling or the like and be primarily designed to serve as a grease trap whereas the shortened filtration element 63 may be made of a thick bio-degradable filtration materials with a second plurality of openings 64 for filtering larger elements or be similar bio-degradable paper toweling which is wrapped or wound to a predetermined thickness. This embodiment of the present invention as illustrated in FIGS. 10 and 11 would operate in a substantially similar manner to the previously described embodiment. In this regard, as the fluid to be filtered enters the inlet 9, the larger particulates are filtered by the shortened filtration element 63 and the smaller particulates as well as grease and other nonparticulates are filtered by the first filtration element 61. The filtered fluid is drained through the outlet 11 as previously described. As the first filtration element 61 becomes clogged, the fluid level rises within the filter element 61 and eventually, shortened filter element 63 until the fluid level reaches at least one of the openings 64 which is above the first filtration element 61. The fluid then flows through these openings above the first filtration element 61 to the outlet 11 thereby allowing the bypassing of the first filtration element 61 when it becomes clogged. Because both the first filtration element 61 and the shortened filtration element 63 are made from bio-degradable filtration materials, they can be easily removed from the support insert 65 and readily disposed of in the garbage to decompose thereby minimizing negative impact to sewage systems and the environment in general. In one alternative embodiment, the first filtration element 61 and the shortened filter element 63 may be made integrally as a single piece. This may be attained by providing a mold in which the materials for the first filtration element (such as paper toweling) is wrapped or wound and is punched with the second plurality of openings 64. Then, the first filtration element 61 may be wrapped around the shortened filter element 63.

From the foregoing discussion, it should now be apparent how the present invention provides an improved filter for removing solids from a liquid with filtration elements that are easily serviceable and that provide adequate filtering of the liquid. It should also now be apparent how the present invention provides such an improved filter with filtration elements that incorporate a bypass feature to allow bypassing of the filtration element when it becomes clogged. While various embodiments in accordance with the present invention have been shown and described, it is understood that the invention is not limited thereto. The present invention may be modified and further applied by those skilled in the art. Therefore, this invention is not limited to the detail shown and described previously, but also includes all such changes and modifications which are encompassed by the claims.

I claim:

1. A drain trap filter unit for removing grease and solids from fluids comprising:

a filter housing with an inlet at a top portion and an outlet towards a bottom portion, said outlet being positioned at a lower elevation than said inlet;

a first filtration element nested within said filter housing, said first filtration element having a first plurality of openings which allow fluids to pass through said first filtration element towards said outlet while filtering solids larger than each opening of said first plurality of openings;

a second filtration element nested within said first filtration element, said second filtration element having a second plurality of openings being configured to allow fluids to pass therethrough and being configured to filter grease and other non-particulate substances from the fluids, wherein said second filtration element has a shorter height than said first filtration element, an upper end thereof being located below at least one opening of said first filtration element thereby allowing bypassing of said second filtration element when said second filtration element is clogged;

mounting means for mounting said filter housing to a drain opening in a sink, and a third filtration element nested within said second filtration element, said third filtration element having a third plurality of openings which allow fluids to pass through said third filtration element while filtering solids larger than each opening of said third plurality of openings, and wherein said second filtration element has a shorter height than said third filtration element, an upper end of said second filtration element being located below at least one opening of said third filtration element, thereby allowing bypass of second filtration element when said second filtration element is clogged; and a fourth filtration element provided on an outer periphery of said first filtration element, said fourth filtration element having a fourth plurality of openings which allow fluids to pass through said fourth filtration element while filtering solids larger than each opening of said fourth plurality of openings and also having a shorter height than said first filtration element, an upper end of said fourth filtration element being located below at least one opening of said first filtration element thereby allowing bypassing of said fourth filtration element when said fourth filtration element is clogged; and wherein said first plurality of openings of said first filtration element further comprises primary openings and secondary openings, said primary openings being smaller than said secondary openings and being positioned at a lower elevation below said secondary openings in a manner to allow bypassing of said primary openings when said primary openings are clogged, and wherein said first filtration element, said second filtration, said third filtration element and said fourth filtration element are nested within said filter housing through said inlet of said filter housing and are serviceable through said inlet of said housing.

2. Filter unit of claim 1, wherein said fourth filtration element comprises at least one of a woven and non-woven material having interstices.

3. Filter unit of claim 2, wherein said fourth filtration element material comprises a disposable paper element.

4. A drain trap filter unit for removing grease and solids from a liquid comprising:

a filter housing with an inlet at a top portion and an outlet towards a bottom portion, said outlet being positioned at a lower elevation than said inlet;

a support insert nested within said filter housing, said support insert having a plurality of support members for supporting at least one filtration element;

a first filtration element nested within said support insert, said first filtration element having a first plurality of openings which allows fluids to pass through said first filtration element towards said outlet while filtering grease and other particulate substances larger than each of said first plurality of openings;

a shortened filtration element nested within said first filtration element, said shortened filtration element having a second plurality of openings allowing fluids to pass there through while filtering solids larger than each opening of said second plurality of openings;

wherein an upper end of said first filtration element is located below at least one opening of said shortened filtration element thereby allowing bypassing of said first filtration element when said first filtration element is clogged.

5. Filter unit of claim 4, wherein each of said first plurality of openings are smaller than each of said plurality of openings.

6. Filter unit of claim 5, wherein said first filtration element comprises at least one of a woven and non-woven material having interstices.

7. Filter unit of claim 6, wherein said first filtration element material comprises a disposable paper element.

8. Filter unit of claim 7, wherein said shortened filtration element material comprises a biodegradable element.

* * * * *